(12) United States Patent
Loberg

(10) Patent No.: US 9,958,858 B2
(45) Date of Patent: May 1, 2018

(54) ASSOCIATING COMPUTER-EXECUTABLE OBJECTS WITH THREE-DIMENSIONAL SPACES WITHIN AN ARCHITECTURAL DESIGN ENVIRONMENT

(71) Applicant: ICE Edge Business Solutions, Ltd., Calgary (CA)

(72) Inventor: Barrie A. Loberg, Millarville (CA)

(73) Assignee: ICE Edge Business Solutions, Ltd., Calgary (CA)

( * ) Notice: Subject to any disclaimer, the term of this patent is extended or adjusted under 35 U.S.C. 154(b) by 0 days. days.

(21) Appl. No.: 14/115,299

(22) PCT Filed: May 31, 2013

(86) PCT No.: PCT/US2013/043735
§ 371 (c)(1),
(2) Date: Nov. 1, 2013

(87) PCT Pub. No.: WO2014/193415
PCT Pub. Date: Dec. 4, 2014

(65) Prior Publication Data
US 2016/0070255 A1  Mar. 10, 2016

(51) Int. Cl.
*G05B 19/4097* (2006.01)
*G06F 17/50* (2006.01)

(52) U.S. Cl.
CPC ..... *G05B 19/4097* (2013.01); *G06F 17/5004* (2013.01); *G05B 2219/35003* (2013.01);
(Continued)

(58) Field of Classification Search
CPC ...... G05B 19/4097; G05B 2219/35003; G05B 2219/35023; G05B 2219/35028;
(Continued)

(56) References Cited

U.S. PATENT DOCUMENTS

| 3,972,163 A | 8/1976 | Coperthwaite |
| 4,207,714 A | 6/1980 | Mehls |

(Continued)

FOREIGN PATENT DOCUMENTS

| EP | 2207140 | 7/2010 |
| JP | 02039377 | 2/1990 |

(Continued)

OTHER PUBLICATIONS

Lau et al., "Converting 3D Furniture Models to Fabricate Parts and Connectors", ACM Transactions on Graphics Jul. 2011.*

(Continued)

*Primary Examiner* — Carlos Ortiz Rodriguez
(74) *Attorney, Agent, or Firm* — Workman Nydegger

(57) ABSTRACT

Methods and systems allow for creating a variable spatial framework for use in designing and manufacturing an architectural component. The spatial framework can define a three-dimensional space having a plurality of boundaries. The system can receive an input to divide the three-dimensional space into multiple independent cells. Each independent cell can comprise an independently executable software object. A plurality of boundaries of the spatial framework can automatically adjust upon receiving an input defining a manufacturing constraint.

20 Claims, 13 Drawing Sheets

(52) U.S. Cl.
CPC ............. *G05B 2219/35023* (2013.01); *G05B 2219/35028* (2013.01); *G05B 2219/35031* (2013.01); *G05B 2219/35051* (2013.01); *G05B 2219/35134* (2013.01); *G06F 2217/02* (2013.01); *G06F 2217/06* (2013.01); *G06F 2217/12* (2013.01); *Y02P 90/265* (2015.11)

(58) Field of Classification Search
CPC ........... G05B 2219/35031; G05B 2219/35051; G05B 2219/35134; G06F 17/5004; G06F 2217/06; G06F 2217/02; G06F 2217/12
See application file for complete search history.

(56) References Cited

U.S. PATENT DOCUMENTS

| | | |
|---|---|---|
| 4,705,401 A | 11/1987 | Addleman |
| 5,255,207 A | 10/1993 | Cornwell |
| 5,625,827 A | 4/1997 | Krause |
| 5,673,374 A | 9/1997 | Sakaibara |
| 5,801,958 A | 9/1998 | Dangelo |
| 5,866,419 A | 2/1999 | Meder |
| 5,870,771 A | 2/1999 | Oberg |
| 6,078,332 A | 6/2000 | Ohazama |
| 6,097,394 A | 8/2000 | Levoy |
| 6,268,863 B1 | 7/2001 | Rioux |
| 6,292,810 B1 | 9/2001 | Richards |
| 6,493,679 B1 | 12/2002 | Rappaport |
| 6,580,426 B1 | 6/2003 | Small |
| 6,629,065 B1 | 9/2003 | Gadh |
| 6,900,841 B1 | 5/2005 | Mihara |
| 6,971,063 B1 | 11/2005 | Rappaport |
| 7,019,753 B2 | 3/2006 | Rappaport |
| 7,062,454 B1 | 6/2006 | Giannini |
| 7,085,697 B1 | 8/2006 | Rappaport |
| 7,096,173 B1 | 8/2006 | Rappaport |
| 7,099,803 B1 | 8/2006 | Rappoport |
| 7,155,228 B2 | 12/2006 | Rappaport |
| 7,171,208 B2 | 1/2007 | Rappaport |
| 7,216,092 B1 | 5/2007 | Weber |
| 7,243,054 B2 | 7/2007 | Rappaport |
| 7,246,045 B1 | 7/2007 | Rappaport |
| 7,277,830 B2 | 10/2007 | Loberg |
| 7,299,168 B2 | 11/2007 | Rappaport |
| 7,299,416 B2 | 11/2007 | Jaeger |
| 7,623,137 B1 | 11/2009 | Miller |
| 7,817,823 B1 | 10/2010 | O'Donnell |
| 7,825,937 B1 | 11/2010 | Sakhartchouk |
| 8,150,660 B2 | 4/2012 | Reghetti |
| 8,255,338 B1 | 8/2012 | Brittan |
| 8,271,336 B2 | 9/2012 | Mikurak |
| 8,276,008 B2 | 9/2012 | Ke |
| 8,285,707 B2 | 10/2012 | Day |
| 8,290,849 B2 | 10/2012 | Eisler |
| 8,301,527 B2 | 10/2012 | Tarbox |
| 8,332,401 B2 | 12/2012 | Hull |
| 8,332,827 B2 | 12/2012 | Edde |
| 8,335,789 B2 | 12/2012 | Hull |
| 8,386,918 B2 | 2/2013 | Do |
| RE44,054 E | 3/2013 | Kim |
| 8,411,086 B2 | 4/2013 | Rieffel |
| 8,423,391 B2 | 4/2013 | Hessedenz |
| 8,510,382 B2 | 4/2013 | Purdy |
| 8,442,850 B2 | 5/2013 | Schorr |
| 8,521,737 B2 | 8/2013 | Hart |
| 8,402,473 B1 | 9/2013 | Becker |
| 8,566,419 B2 | 10/2013 | Purdy |
| 8,600,989 B2 | 12/2013 | Hull |
| 8,626,877 B2 | 1/2014 | Greene |
| 8,645,973 B2 | 2/2014 | Bosworth |
| 8,650,179 B2 | 2/2014 | Driesch |
| 8,773,433 B1 | 7/2014 | Smyrl |
| 2003/0011596 A1 | 1/2003 | Zhang |
| 2004/0027371 A1 | 2/2004 | Jaeger |
| 2004/0075655 A1 | 4/2004 | Dunnett |
| 2004/0100465 A1 | 5/2004 | Stowe |
| 2004/0174358 A1 | 9/2004 | Takagi |
| 2005/0044133 A1 | 2/2005 | Hashimoto |
| 2005/0072059 A1 | 4/2005 | Hodsdon |
| 2005/0104883 A1 | 5/2005 | Snyder |
| 2006/0041842 A1 | 2/2006 | Loberg |
| 2006/0274064 A1 | 12/2006 | Dougherty |
| 2007/0098290 A1 | 5/2007 | Barton |
| 2007/0109310 A1 | 5/2007 | Xu |
| 2007/0276791 A1 | 11/2007 | Fejes |
| 2009/0128558 A1 | 5/2009 | Morello |
| 2009/0187389 A1 | 7/2009 | Dobbins |
| 2010/0018141 A1 | 1/2010 | Kelly |
| 2010/0036520 A1 | 2/2010 | Barbir |
| 2010/0128038 A1 | 5/2010 | Hoffman |
| 2010/0268513 A1 | 10/2010 | Loberg |
| 2011/0054652 A1 | 3/2011 | Heil |
| 2011/0191706 A1 | 8/2011 | Loberg |
| 2011/0227922 A1 | 9/2011 | Shim |
| 2011/0227924 A1 | 9/2011 | Nakajima |
| 2011/0265405 A1 | 11/2011 | Ksenych |
| 2012/0288184 A1 | 11/2012 | Zomet |
| 2014/0095122 A1 | 4/2014 | Appleman |
| 2014/0176530 A1 | 6/2014 | Pathre |

FOREIGN PATENT DOCUMENTS

| | | |
|---|---|---|
| JP | 2000132706 | 5/2000 |
| JP | 2007264707 | 10/2007 |
| KR | 1020090126574 | 12/2009 |
| WO | 02059545 | 8/2002 |
| WO | 2007138560 | 12/2007 |
| WO | 2009111885 | 9/2009 |
| WO | WO2013040016 | 3/2012 |
| WO | 2012162442 | 11/2012 |
| WO | 2012173741 | 12/2012 |
| WO | 2014191828 | 12/2014 |

OTHER PUBLICATIONS

Autodesk Revit architecture for AutoCAD Users, White Paper, Autodesk, Inc., 2011.*
Ram Schacked et al.: "Automatic Lighting Design Using a Perceptual Quality Metric"; 2001; Eurographic 2011 vol. 20 (2001); p. 1-12.
Non-Final Office action for U.S. Appl. No. 14/113,260 dated Sep. 14, 2015.
Non-Final Office action for U.S. Appl. No. 14/348,879 dated Sep. 22, 2015.
Non-Final Office Action for U.S. Appl. No. 14/110,910 dated for Sep. 14, 2015.
Final Office Action for U.S. Appl. No. 14/110,910 dated Feb. 2, 2016.
Final Office Action for U.S. Appl. No. 14/348,879 dated Feb. 22, 2016.
Notice of Allowance for U.S. Appl. No. 14/113,260 dated Mar. 23, 2016.
Cruless, Ray Tracing URL: http://courses.cs.washington.edu/courses/cse557/09au/lectures/ray-tracing.pdf, Washington University, CSE 557 Falll 2009. pp. 1-40.
Non-Final Office Action in U.S. Appl. No. 14/110,910 dated Aug. 12, 2016.
John Chapman: "john-chapman.net—Deferred Rendering, Transparency & Alpha Blending", Aug. 1, 2011 (Aug. 1, 2011), pp. 1-7, XP0552959287, Retrieved from the Internet: URL:http://www.john-chapman.net/content.php?id=13 [retrieved on Aug. 17, 2016].
Anonymous: OpenGL FAQ / 15 Transparency, Translucency, and Using Blending. Dec. 30, 1999 (Dec. 30, 1999), XP055273530, Retrieved from the Internet: URL: http://www.opengl.org/archives/resources/faq/technical/transparency.htm [retrieved on May 19, 2016].
Supplementary European Search Report for application No. EP13/873,685 dated Sep. 7, 2016.
Non-Final Office Action for U.S. Appl. No. 14/117,844 dated Sep. 29, 2016.

(56) References Cited

OTHER PUBLICATIONS

European Search Report for application No. EP 13/872,502 dated Aug. 17, 2016.
Michael Kass: "Interactive Depth of Field Using Simulated Diffusion on a GPU", 2006, pp. 1-8, XP002760859, Retrieved from the Internet: URL: http://graphics.pixar.com/library/DepthOfField/paper.pdf [, retrieved on Aug. 17, 2016].
Shaan Hurley: "Learn to Walk and Fly in AutoCAD", Jan. 23, 2009 (Jan. 23, 2000), pp. 1-7, XP002760860, Retrieved from the Internet: URL: http://autodesk.blogs.com/between_the_lines/2009/01/learn-to-walk-and-fly-in-autocad.html [retrieved on Aug. 17, 2016].
Nousch M et al: "CAD on the World Wide Web: virtual assembly of furniture with Beaver", Proceedings/VRML 99, Fourth Symposium on the Virtual Reality Modeling Language, Paperborn Germany, Feb. 23-26, 1999, ACM New York, NY, USA, Feb. 23, 1999 (Feb. 23, 1999), pp. 113-119, XP002172203, DOI: 10.1145/299246.299283 ISBN: 978-1-58113-079-9.
Jean-Eudes Marvie et al: "The FL-system: a functional L-system for procedural geometric modeling", The Visual Computer; International Journal of Computer Graphics, Springer, Berlin, DE, vol. 21, No. 5, Jun. 1, 2005 (Jun. 1, 2005), pp. 329-339, XP019339112, ISSN:1432-8726, DOI: 10.1007/500371-005-0289-Z.
Supplementary European Search Report for application No. EP13885841 dated Sep. 30, 2016.
Notice of Allowance in U.S. Appl. No. 14/110,910 dated Dec. 13, 2016.
Ravi Mamoorthi et al., "A First-Order Analysis of Lighting, Shading, and Shadows," ACM Transactions on Graphics vol. 26, No. 1, Article 2, Jan. 31, 2007. See p. 2, 8, and 12-15.
ERCO, "ERCO Guide," http://www.erco.com/download/ data/30_media/guide_pdf/ 120_en/_erco_guide_7_simulation.pdf, May 12, 2006. See p. 376, 389-388, 399, and 427.
Joseph Zupko et al., "System for Automated Interactive Lighting (SAIL)," In: Proceedings for the 4th Conference International on Foundations of Digital Games, 2009, pp. 223-230. See pp. 223-226.
Maxwell Render, "Maxwell Render 2.5 User Manual," http://www.architektur.uni-kl.de/digitalewrkzeuge/ss13/digitalewerkzeuge/maxwel-english.pdf, Dec. 31, 2010. See p. 22-25, 36-37, and 48-49.
Jeremy Birn, "Digital Lighting and Rendering," Pearson Education, 2nd ed., 2006, ISBN 0132798212. See p. 35-59.
Pierre-Felix Breton, "Autodesk Revit and ads Max Design for Lighting and Daylighting simulation," http://www.pfbreton.com/wordpress/wp-content/uploads/2012/05/L12L07%20Handout.pdf, May 7, 2012. See pp. 28, 51-52, and 87-103.
David Cohn, "Photorealistic Rendering Techniques in AutoCAD3D," Autodesk University 2009, http://www.dscohn.com/AU/handouts/AU214-2%20-%20Photorealistic%20Rendering%20Techniques%20in%20AutoCAD%203D.pdf, Dec. 31, 2009. See pp. 4-6.
International Search Report and Written Opinion for PCT/US2012/068805 dated Aug. 29, 2013.
International Search Report and Written Opinion for PCT/US2013/024009 dated Oct. 25, 2013.
International Search Report and Written Opinion for PCT/US2013/024063 dated Oct. 25, 2013.
International Search Report and written opinion for PCT/US2013/023198 dated Oct. 18, 2013.
International Search Report and Opinion, PCT/US2013/045047, dated Mar. 3, 2014.
International Search Report and Opinion, PCT/US2013/043735, dated Feb. 27, 2014.
International Search Report and Opinion, PCT/US2013/050764, dated Feb. 27, 2014.
Supplementary European Search Report for application No. EP13873507 dated Jun. 15, 2017.
Gene S. Miller et al: "Illumination and Reflection Maps: Simulated Objects in Simulated and Real Environments", Course Notes for Advanced Computer Graphics Animation, SIGGRAPH 1984, Jul. 23, 1984 (Jul. 23, 1984), pp. 1-7, XP055372329, Retrieved from the Internet: URL:http://www.pauldebevec.com/ReflectionMapping/IluMAP84.html [retrieved on May 12, 2017] *sections 3-8*.
Wolfgang Heidrich et al: "Realistic, hardware-accelerated shading and lighting", Computer Graphics Proceedings. SIGGRAPH 99; [Computer Graphics Proceedings. SIGGRAPH], ACM ?—New York, NY, USA 1515 Broadway, 17th Floor New York, NW 10036 USA, Jul. 1999 (Jul. 1999), pp. 171-178, XP058128790, DOI: 10.1145/311535.311554 ISBN: 978-0-201-48560-8 *Sections 3 and 4*.
International Search Report PCT/IB2014/001055, dated Mar. 24, 2014.
Non-Final Office action for U.S. Appl. No. 14/117,844 dated Sep. 8, 2017.
Singapore Search Report and Written Opinion for application No. 11201608357X dated Oct. 2, 2017.
Non-Final Office Action for U.S. Appl. No. 14/891,007 dated Jan. 26, 2018.

* cited by examiner

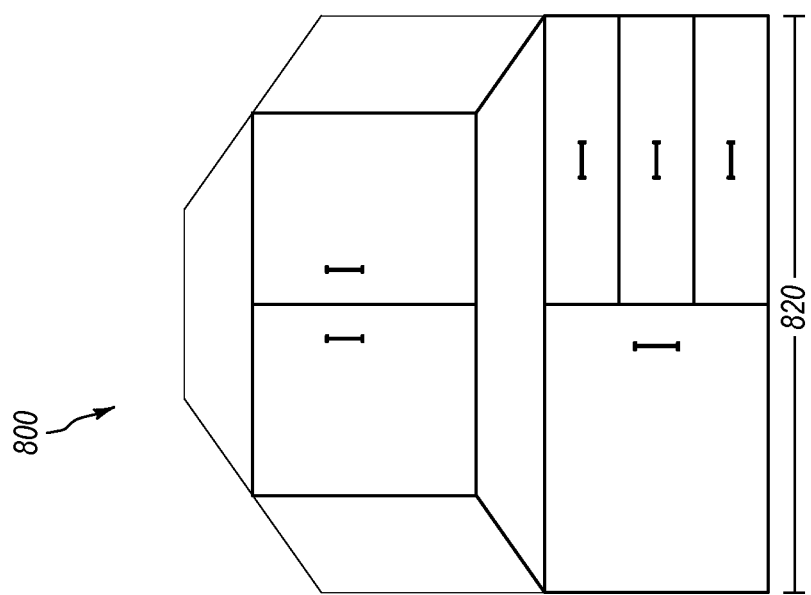

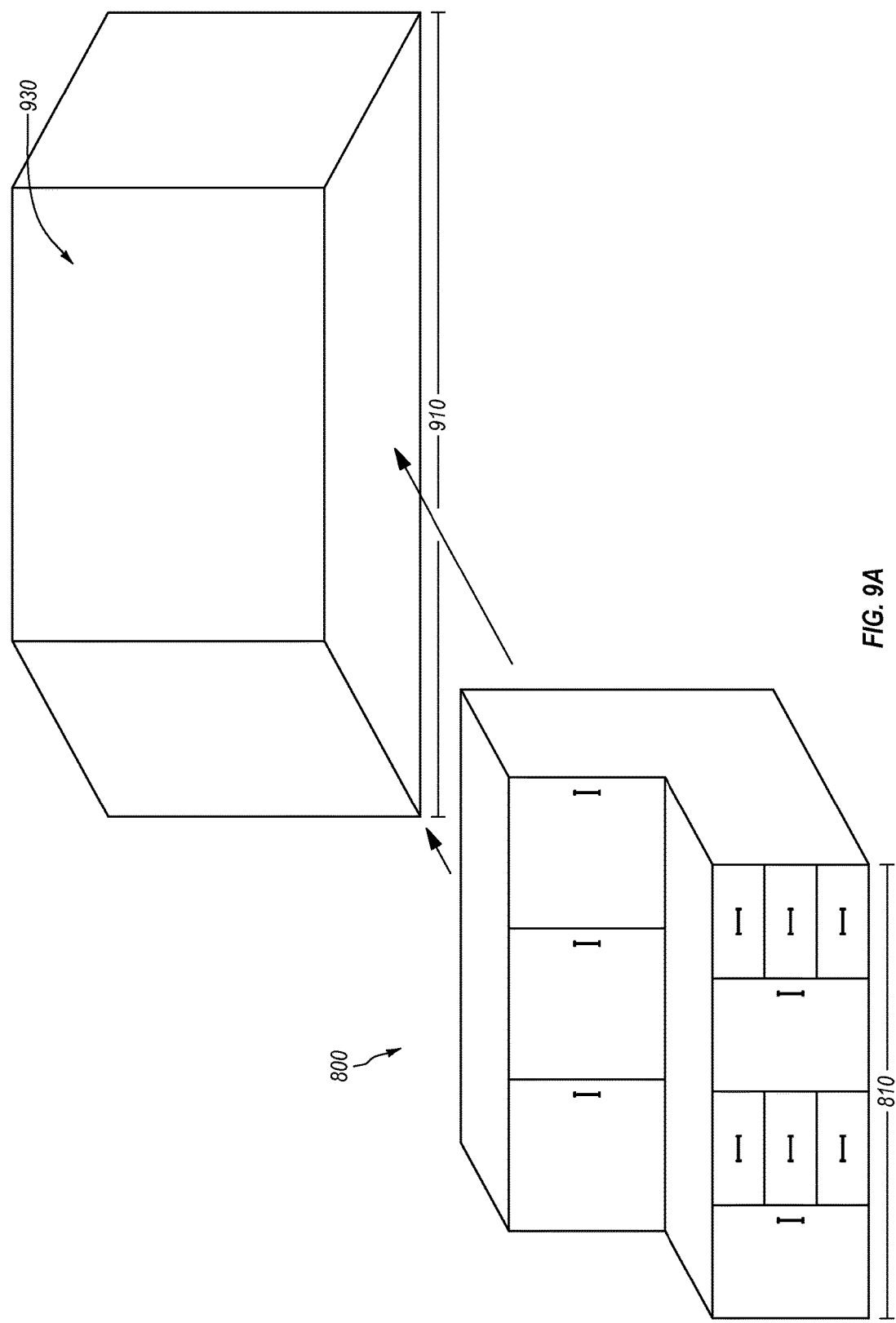

ASSOCIATING COMPUTER-EXECUTABLE OBJECTS WITH THREE-DIMENSIONAL SPACES WITHIN AN ARCHITECTURAL DESIGN ENVIRONMENT

CROSS-REFERENCE TO RELATED APPLICATIONS

The present invention is a 35 U.S.C. § 371 U.S. National Stage of PCT Application No. PCT/US2013/043735 entitled "Associating Computer-Executable Objects with Three-Dimensional Spaces within an Architectural Design Environment," filed May 31, 2013, the entire content of which is incorporated herein by reference.

BACKGROUND OF THE INVENTION

1. The Field of the Invention

This invention relates to generally to computer-aided design or drafting software.

2. Background and Relevant Art

As computerized systems have increased in popularity so have the range of applications that incorporate computational technology. Computational technology now extends across a broad range of applications, including a wide range of productivity and entertainment software. Indeed, computational technology and related software can now be found in a wide range of generic applications that are suited for many environments, as well as fairly industry-specific software.

One such industry that has employed specific types of software and other computational technology increasingly over the past few years is that related to building and/or architectural design. In particular, architects and interior designers ("or designers") use a wide range of computer-aided design (CAD) software for designing the aesthetic as well as functional aspects of a given residential or commercial space. For example, a designer might use a CAD program to design fixtures and furniture for a particular office. The designer might then export the designs to be manufactured by a particular millwork facility.

While millwork is becoming a more common method of producing furniture, producing custom millwork furniture can be an expensive and time-consuming process. For example, conventional systems may require that custom furniture first be meticulously designed within a CAD program. Additionally, prior to designing the furniture or fixture within the CAD program, conventional systems may require that the specifications of the end product be exactly known ahead of time. For instance, a designer may need to know the exact dimensions of the object being designed, along with the finishing features, such as joint type, hinge type, door sizes, etc.

Additionally, in at least some conventional systems, great expense is incurred if any design changes are made after the initial CAD model is created. If, for example, it is discovered that an initial measurement was incorrect, the entire design may need to be manually adjusted or even re-created taking into account the correct measurement. In addition, large cost can be incurred by simply switching from one millwork provider to another. For example, different millwork providers may use different joints, different hardware, different materials, materials of different dimensions, etc. As mentioned above, even slight changes such as these may require significant reworking the CAD design.

Accordingly, there are a number of problems in the art relating to modeling architectural elements within a CAD program and later manufacturing those elements with a millwork facility.

BRIEF SUMMARY OF THE INVENTION

Implementations of the present invention overcome one or more problems in the art with systems, methods, and apparatus configured to create spatial frameworks of architectural elements that are automatically adjustable to a plurality of different materials, dimensions, features, and other design constraints. In particular, in at least one implementation of the present invention, a spatial framework of an architectural element can be created and then sent to a plurality of different millwork providers. The spatial framework can then automatically adjust to account for the materials, accessories, and methods of manufacture used by the particular millwork provider. Additionally, in at least one implementation, a single framework can be used to create a plurality of architectural elements of varying sizes and shapes without having to completely redesign the framework.

For example, a method in accordance with at least one implementation of creating a variable spatial framework for use in designing and manufacturing an architectural component can include receiving input for a spatial framework for use in designing and manufacturing an architectural component up to and including an entire building design. The spatial framework can define a three-dimensional space having a plurality of boundaries. The method can also include receiving input to divide the three-dimensional space. In such a case, input dividing the three-dimensional space changes the three-dimensional space into multiple independent cells. Additionally, each independent cell can comprise an independently executable software object. Further, a plurality of boundaries of the spatial framework can automatically adjust upon receiving an input defining a manufacturing constraint or sizing constraint.

In an additional or alternative implementation, a method can include creating a variable spatial framework for use in designing and manufacturing an architectural component. The method can also include receiving input for a spatial framework for use in designing and manufacturing an architectural component. In particular, the spatial framework can define a three-dimensional space having a plurality of boundaries. The method can also include receiving input to divide the three-dimensional space, such that the input changes the three-dimensional space into multiple independent cells. In such a case, each independent cell can comprise an independently executable software object. Additionally, the method can include receiving at least one manufacturing constraint that defines at least one physical characteristic of an object that will be manufactured based upon the spatial framework. Further, the method can include automatically accessing at least one independently executable software object to adjust at least a portion of the spatial framework to incorporate the received manufacturing constraint.

These and other objects and features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof, which are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which:

FIGS. 8A and 8B depict an architectural element being shrunk to fit a particular specification;

FIGS. 9A and 9B depict an architectural element being expanded to fit a particular specification;

DETAILED DESCRIPTION OF THE PREFERRED EMBODIMENTS

Figure 1:
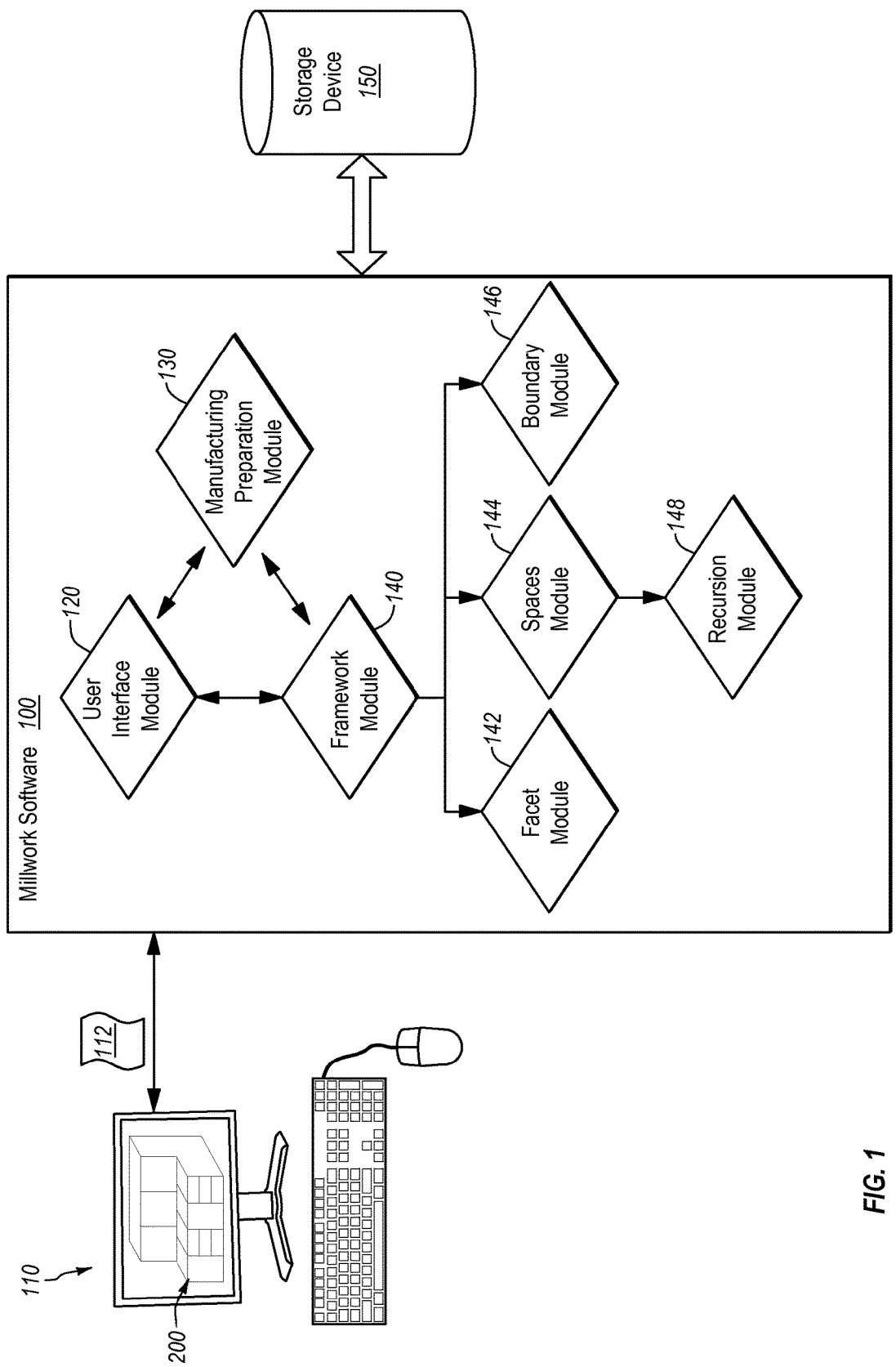
FIG. 1 illustrates an architectural schematic diagram of a system for designing and manufacturing an architectural element.

Implementations of the present invention extend to systems, methods, and apparatus configured to create spatial frameworks of architectural elements that are automatically adjustable to a plurality of different materials, dimensions, features, and other design constraints. In particular, in at least one implementation of the present invention, a spatial framework of an architectural element can be created and then sent to a plurality of different millwork providers. The spatial framework can then automatically adjust to account for the materials, accessories, and methods of manufacture used by the particular millwork provider. Additionally, in at least one implementation, a single framework can be used to create a plurality of architectural elements of varying sizes and shapes without having to completely redesign the framework.

For example, in at least one implementation of the present invention, a user can use an object oriented CAD program of the present invention to create a spatial framework representative of an architectural element, for example, a desk with drawers. As the user is creating the framework of the desk with drawers, the CAD program can automatically create the surfaces and spaces that will make up the architectural element by analyzing the user's input. Additionally, the CAD program can identify potential uses for the spaces.

In at least one implementation, the space is identified and tracked by assigning an independently executable software object to the space. As an independently executable software object, the space can have independent functions and variables associated with it. As needed, these functions and variables can automatically adjust the space, and in turn the planes that define the space in response to manufacturing constraints.

In addition, at least some independently executable software objects can recursively link to additional independently executable software objects. For example, in at least one implementation, a software object associated with a space can reference a second software object that is associated with another framework. As will be described more fully below, this feature can provide significant flexibility and power to a designer who is creating large or complex frameworks.

Additionally, in at least one implementation, the present invention can aid in automatically resolving anomalies among the joints that are used to construct the architectural element. For example, an architectural element can use, among other possible joints, miter joints, underlap joints, and/or overlap joints. Some combinations of these joints, however, can result in an impossible configuration or a configuration with an anomaly—often at a corner. At least one implementation of the present invention can automatically identify an impossible configuration or a configuration that may create an anomaly and automatically resolve the conflict to create an architectural element with appropriate joints.

The present invention can also allow a user to create a framework for an architectural element without knowing many of the end features that the element will comprise. For example, in at least one implementation, a user can create a framework for an entire kitchen without knowing the material that will be used, the dimensions of the resulting kitchen, the manufacturing specific fixtures, and many other similar details. Once the digital framework is completed a specific millwork facility can enter in the details of its materials, fixtures, configurations, and the actual specifications and/or dimensions of the end product, and the digital framework can automatically adjust to conform to the entered information.

In contrast, in at least one implementation, a user can enter known factors before design work has began or early in the process. For example, a user can enter the length of a wall in the kitchen, a particular type of sink that will be used, a specific material type, etc. Once the known parameters have been entered, the present invention can automatically incorporate the parameters into the framework as the user designs the actual kitchen layout.

FIG. 1 depicts an architectural schematic diagram of a computer system for designing and manufacturing an architectural element. In particular, FIG. 1 shows a computer terminal 110 that is in communication with a millwork software application 100. The millwork software application 100 can be executed from the computer terminal 110, from a server (not shown) that the computer terminal 110 is accessing, or by using some other known method of execution.

The millwork software application 100 can comprise a plurality of modules 120, 130, 140, 142, 144, 146, 148 that are adapted to aid in designing a file for millwork. In at least one implementation, the millwork software application 100 can comprise a user interface module 120, a manufacturing preparation module 130, a framework module 140, a facet module 142, a spaces module 144, a boundary module 146, a recursion module 148, and a storage device 150. One will understand, however, that the separation of modules into discrete units is arbitrary and that modules that be combined, associated, or separated in ways other than shown in FIG. 1 and still accomplish the purposes of this invention. Accordingly, the particular modules 120, 130, 140, 142, 144, 146, 148 of FIG. 1 are only shown for illustrative and exemplary purposes.

The user interface module 120 can be in communication with the computer terminal 110 through a series of data packets 112. For example, the user interface module 120 can display images and graphical controls to a user through a computer monitor and can receive input from a user through a keyboard and/or mouse. As a user creates and/or manipulates a particular framework of an architectural element, the user interface module 120 can communicate to and receive instructions from the framework module 140. The framework module 140 can in turn communicate with the facet module 142, the spaces module 144, the boundary module 146, and the recursion module 148.

Ultimately, either user interface module 120 or framework module 140 can communicate with manufacturing preparation module 130 to create a file that is prepared for use in a millwork facility. Additionally, the various modules can communicate with a storage device 150. The storage device 150 can contain, among other things, templates for a variety of different designs, completed designs that can be used on a standalone basis or incorporated into other designs, tool lists and/or manufacturing information specific to particular millwork facilities, and/or particular design features.

One will appreciate in view of the specification and claims herein that the user interface module 120 can provide to the user an option to create and make design changes to a framework 200. In at least one implementation, upon receiving a request for some modification, the user interface module 120 can communicate the request to the framework module 140. For example, a user may desire to design a desk for production at a millwork facility. Accordingly, a user may enter instructions into the computer terminal 110 to design and create the desk. The user interface module 120 can in turn communicate those instructions to the framework module 140.

Upon receiving the instructions, the framework module 140 can communicate with the appropriate module to execute the request. For example, if the user desires to split the upper surface of the desk into two portions, the facet module 142 can be used. The facet module 142 can modify and track surfaces within the framework 200. In contrast, if the user desires to split a space into two spaces, the spaces module 144 can be used. The spaces module 144 can modify and track spaces within the framework 200.

For instance, the spaces module 144 can allow the user to split the framework 200 in half and create one half of the desk that is dedicated to drawers and another half that is open space for the user to place his or her chair and feet. Additionally, a user may use the spaces module 144 to split the framework 200 into any number of other divisions, for example thirds. In at least one implementation, the divisions do not need to be proportionally equal. For instance, the spaces module 144 can allow a user to move the single split mentioned above such that the drawers of the desk only take up one-third of the framework, while the leg space takes up the remaining two-thirds. In at least one implementation, the facet module 142 can perform similar functions on surfaces within the framework 200.

In addition, the boundary module 146 can automatically check joints within the framework 200 to determine if any "anomalies" exist. For example, if a user specifies that particular joint should be a miter joint, the boundary module 146 can analyze all of the joints within the desk to determine whether the remaining boundaries properly form around the entire desk. If anomalies are detected (e.g., improperly overlapped joints, or other inappropriate positioning), the boundary module 146 can automatically resolve them and create proper joints throughout the desk.

Once the user has finished designing the architectural element, in this case a desk, the manufacturing preparation module 130 can receive millwork facility specific details and specifications relating to the final details of the architectural element. For example, a particular millwork facility may use a dovetail joint to assemble the drawers of the dresser. Additionally, the millwork facility may use a particular type of wood that comprises a specific thickness. Upon receiving this information the manufacturing preparation module 130 can automatically adjust the framework 200 of the desk to create a design that incorporates the dovetail joint, wood type and wood thickness, and can be manufactured at the millwork facility. In contrast, in at least one implementation, the manufacturing preparation module 130 may not make any changes to the actual framework 200, but instead the manufacturing preparation module 130 may make the necessary changes to the actual manufacturing code (e.g., CNC code).

Similarly, the manufacturing preparation module 130 can automatically adjust the framework 200 of the desk to meet final specifications. For example, a user may originally design a desk to comprise a specific length. Later the user may realize that the original length was either too long or too short. The manufacturing preparation module 130 can be used to automatically adjust the desk and all of the resulting components of the desk to fit the updated specification.

Figure 2A:
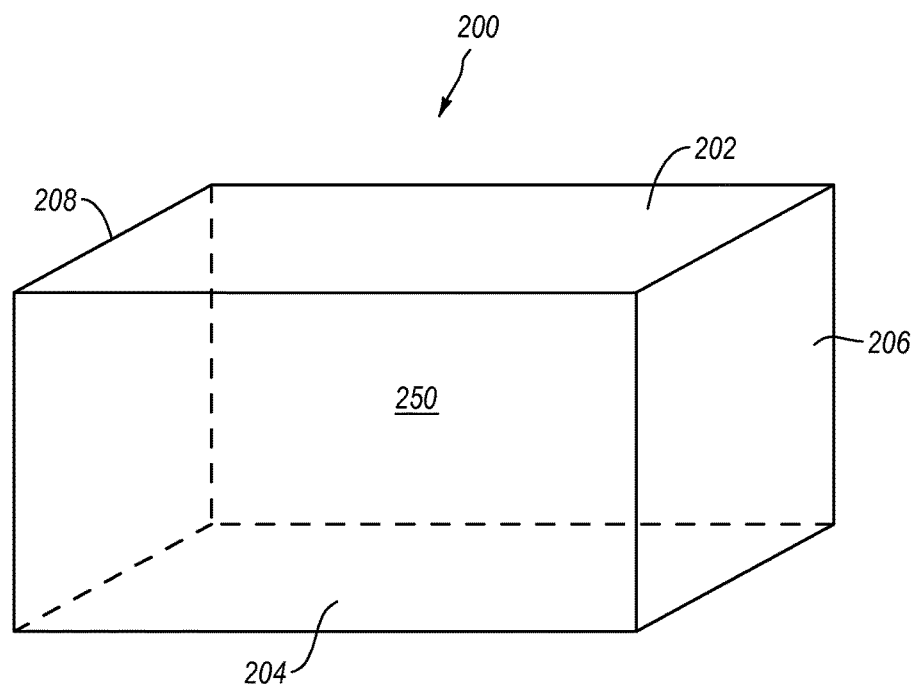
FIGS. 2A-2C depict various implementations of a spatial framework.
Figure 2B:
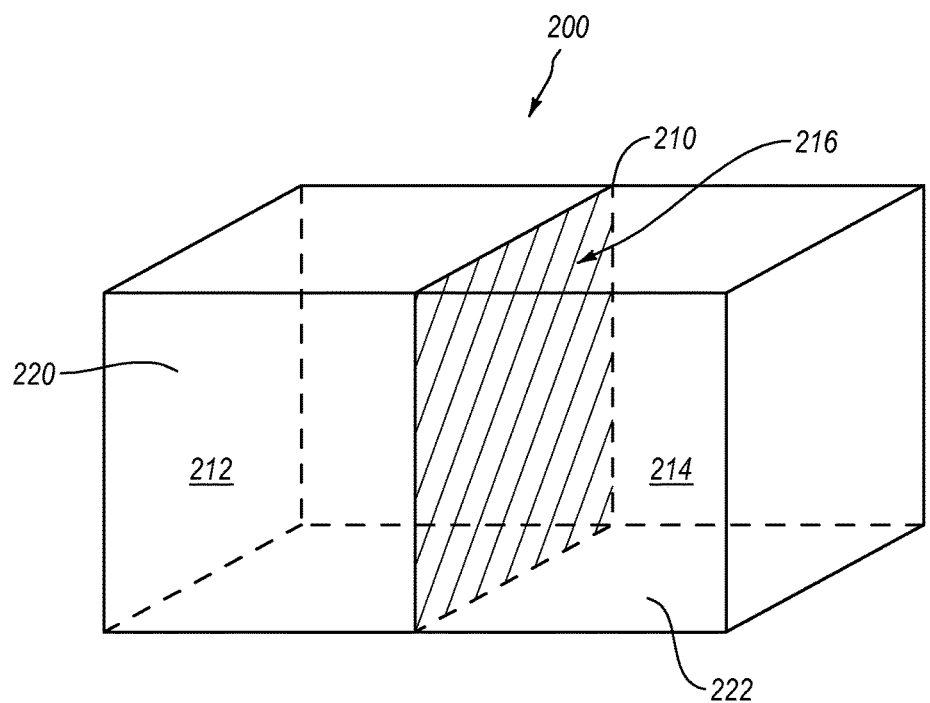
Figure 2C:
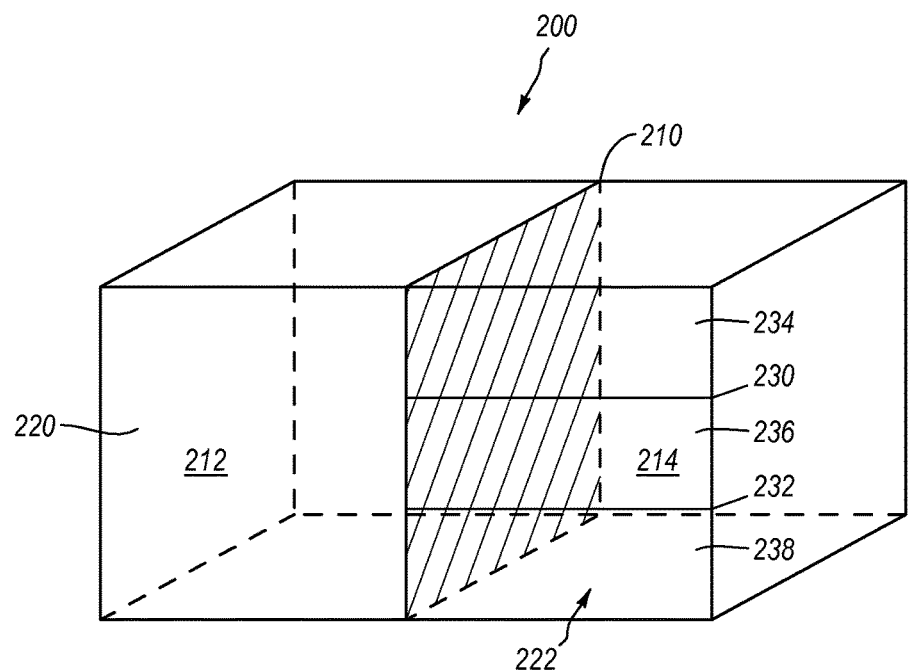

FIGS. 2A-2C depict various implementations of a spatial framework 200. As shown in FIG. 2A, the spatial framework 200 can comprise a simple cube. In at least one implementation, the millwork software 100 can comprise a plurality of simply shaped frameworks 200 that can be used as starting points for designing an architectural element. In general, the spatial framework 200 can be a computer model of an architectural element that captures the design intent of a user.

In particular, the spatial framework 200 can capture data relating to the outline of an architectural element and the position of components in the element with respect to each other. To accomplish this, the spatial framework 200 can comprise a space 250 that is associated with an independently executable software object. The independently executable software object can assist in tracking and managing the various components of the designed architectural element. In at least one implementation, the space 250 and independently executable software object are both managed by the spaces module 144.

FIG. 2A also depicts that the framework 200 can comprise "facets" 202, 204, 206 and boundaries 208. By way of explanation, "facets" 202, 204, 206 represent surfaces within the framework. Facets 202, 204, 206, however, may not always correlate to surfaces within the finished architectural element. For example, facets 202, 204, 206 may only be quasi-two-dimensional because they can comprise a specified thickness. In some cases, a user can set the thickness of a particular facet to be zero. As a result the facet can still be a part of the framework 200 but it will not be a part of the finished architectural element. "Boundaries," on the other hand, represent lines where facets meet. In at least one implementation, a specific boundary's location can be defined with respect to the other boundaries that the specific boundary intersects.

FIG. 2B depicts an implementation of a framework 200 that has been bisected by a "cube splitter" 210. As depicted, the cube splitter 210 splits or divides space 250 in half creating two new spaces 212 and 214. In at least one implementation, the creation of two new spaces 212, 214 also results in the creation of two new independently executable software objects associated with each space 212, 214. It should be understood that while cubes and squares are used to illustrate embodiments of the present invention within this application, in at least one implementation, many different shapes and configurations of a framework 200 can be used.

In particular, in at least one implementation, the newly created independently executable software objects associated with spaces 212 and 214 may each inherit the parameters and characteristics of the independently executable software object that was originally associated with space 250. In at least one implementation, due to this inheritance, if space 250 originally comprises a set of drawers, after the split, spaces 212 and 214 can each automatically comprise a set of drawers that mirror the original drawers of space 250.

The cube splitter 210 can also create a new facet 216 within the framework 200 and a plurality of new facets (for example 220, 222) on each external surface of the framework 200. As mentioned above, the new facets 216, 220, 222 can each comprise a unique thicknesses such that the facets 216, 220, 222 comprises physical surfaces within the architectural element, or the facets 216, 220, 222 can comprise thicknesses of zero, resulting in the facets 216, 220, 222 only being represented within the framework 200 but not within the finished architectural element.

FIG. 2C depicts the framework of FIG. 2B comprising two facet splitters 230, 232. As depicted, the facet splitters 230, 232 can split facet 222 into three new facets 234, 236, 238. In at least one implementation, a facet splitter 230, 232 can split only facets 220, 222, 234, 236, 238, as opposed to a cube splitter 210, which can split an entire space 250, 212, 214. In addition, in at least one implementation, the new facets 234, 236, 238 remain associated with space 214 and thus can be associated with the independently executable software object that is associated with space 214.

Figure 3:
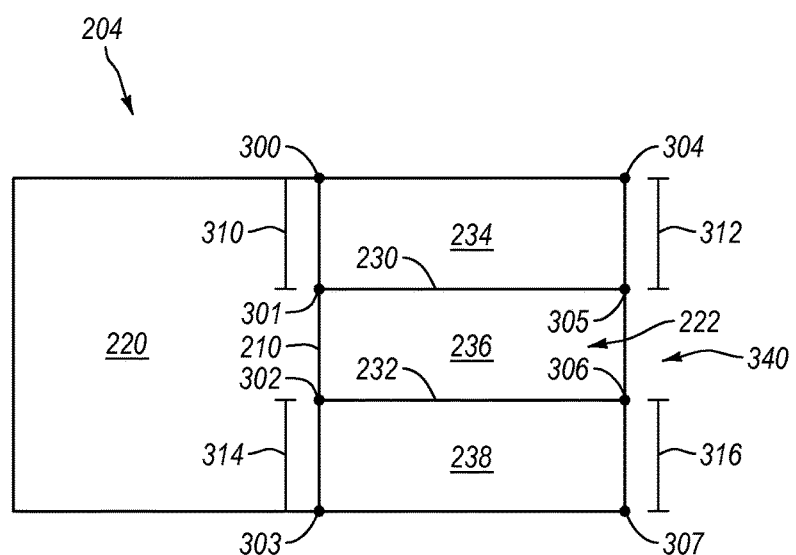
FIG. 3 depicts a planar view of a spatial framework.

FIG. 3 depicts a quasi-two-dimensional view of front face 204 of the framework 200 from FIG. 2C. As mentioned previously, the view is quasi-two-dimensional because each facet can in fact comprise a thickness. FIG. 3 shows facet 220, which was formed by the placement of cube splitter 210, and facets 234, 236, and 238, which were formed by the placement of facet splitters 230 and 232. Additionally, FIG. 3 depicts the end point 300, 301, 302, 303, 304, 305, 306, 307, 320, 322 of each boundary within the front face of the framework. In at least one implementation, a user can interact with the framework 200 through either a three-dimensional view (e.g., FIGS. 2A-2C) or through a quasi-two-dimensional view (e.g., FIG. 3). In either view, the location and behavior of the facets can be managed by the facet module 142.

In at least one implementation, the location and positioning of the cube splitters 210 and facet splitters 230, 236, 238 within the framework can be tracked with respect to the end points 300, 301, 302, 303, 304, 305, 306, 307, 320, 322 of each respective facet splitter 230, 236, 238 or cube splitter 210, and in particular, where those end points intersect other boundaries. In at least one implementation, the location of the end point intersections can be tracked as a finite distance or as a proportion of the total length of the respective boundary.

For example, facet splitter 230 comprises end points 301 and 305. In at least one implementation, the location of facet splitter 230 can be designated as end point 301 being located distance 310 from the top of cube splitter 210 and end point 305 being located distance 312 from the top of side boundary 340. Similarly, the location of facet splitter 232 can be designated as end point 302 being positioned ⅓ up the length of cube splitter 210, and similarly, end point 306 being location ⅓ up the length of side boundary 340.

One will understand how similar measurement schemes can be used to locate and position any number of facet splitters and/or cube splitters within a framework 200. Additionally, one will understand that using a finite length or a proportional length can impact the future millwork of the architectural element. For example, if a user resizes an item framework 200 by expanding the framework in all directions, then facet splitter 230 can still be located distance 310 and 312 from the top of cube splitter 210, and from the side boundary 340 respectively. Facet splitter 232, on the other hand, can change in absolute position such that each end point 302, 306 is ⅓ up the length of their respective boundaries 210, 340.

In at least one implementation, the framework 200 can be shrunk so much that absolute distance 310 and distance 312 exceed ⅔ of the total length of boundaries 210 and 340 respectively. One will understand that this can cause facet splitter 230 to overlap facet splitter 282. In this situation, the framework module 140 can automatically determine that either facet splitter 232 or facet splitter 230 should automatically be removed leaving only a single facet splitter 232, 230. For example, in at least one implementation, a user can set an option to automatically give fixed lengths 310, 312 priority over proportional lengths 303, 316 or to automatically give proportional lengths 303, 316 priority over fixed lengths 310, 312.

Additionally, a user may be able to set an option that gives priority to the first facet splitter 230, 232 or cube splitter 210 created over subsequent facet splitters 230, 232 or cube splitters 210. In contrast, a user may be able to set an option that gives priority to the last facet splitter 230, 232 or cube splitter 210 created over previous facet splitters 230, 232 or cube splitters 210. Further, in at least one implementation, a user can specifically designate that a particular facet splitter 230, 23 or cube splitter 210 should be given priority over other facet splitters 230, 232 and/or cube splitters 210.

Allowing a user to determine whether a facet splitter or cube splitter should be located on a proportional distance basis or on an absolute distance basis can provide the user with significant control over how an architectural element can be resized and manipulated. Additionally, allowing a user to determine the priority that particular cube splitters and/or facet splitters can be given when the splitters conflict with each allows a user to have control over the final configuration of an architectural element that has been resized.

Figure 4A:
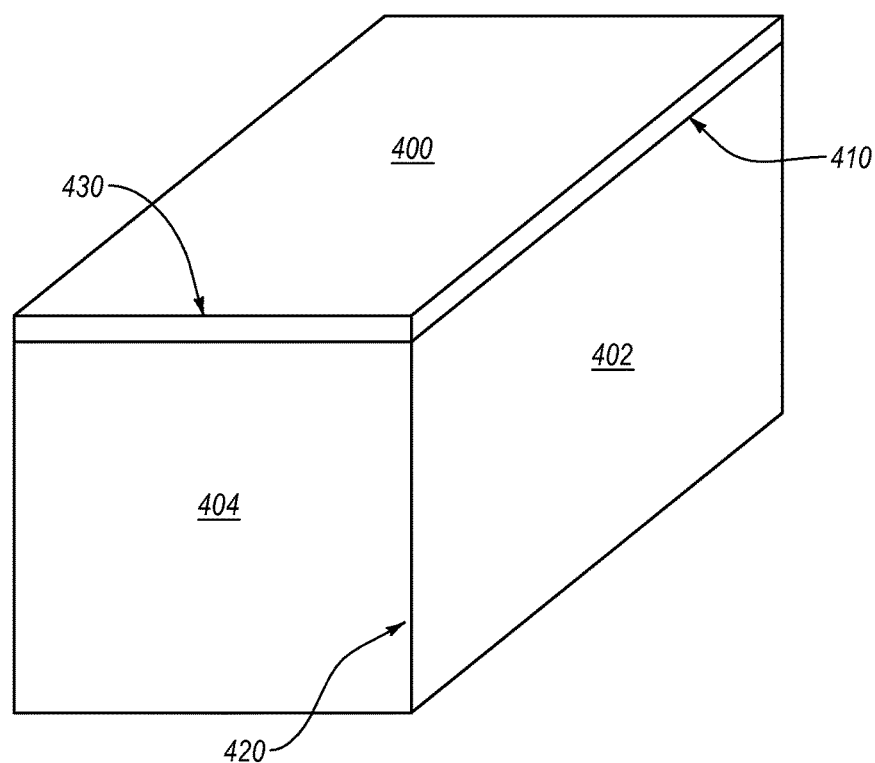
FIGS. 4A and 4B depict various implementations of boundary detection and correction.
Figure 4B:
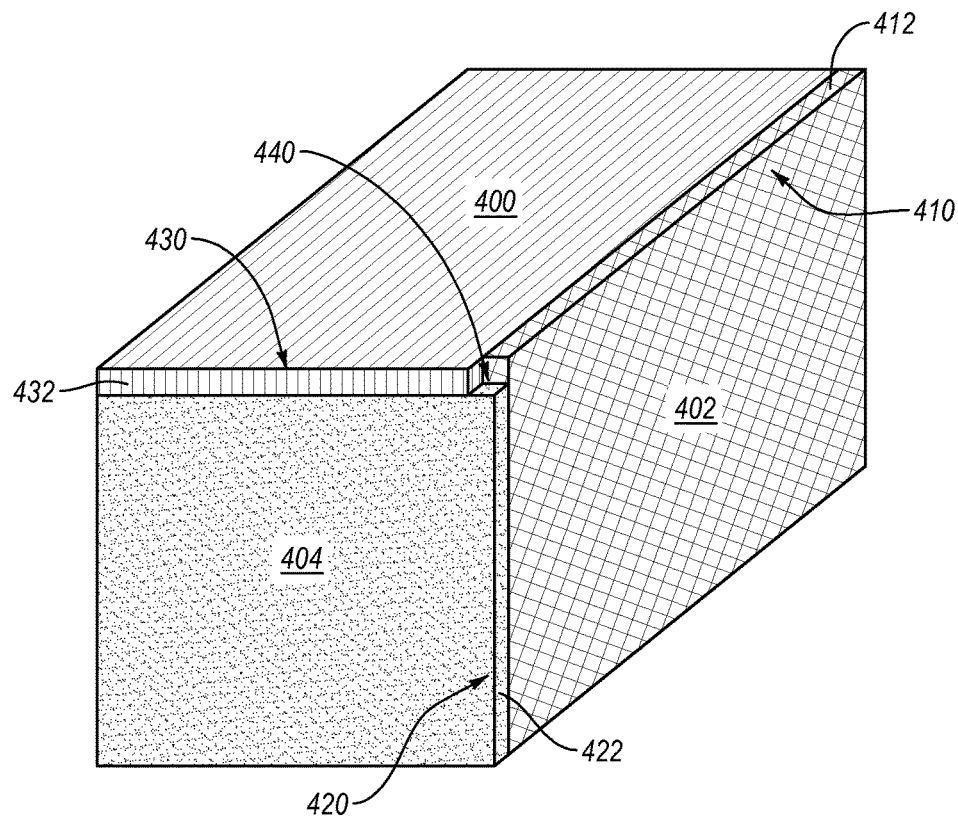

FIGS. 4A and 4B depict various implementations of boundary detection and correction. In at least one implementation, as a user designs a framework 200 for a particular architectural element, the user is able to specify the type of joints that the user desires to join particular surfaces of the architectural element. As a user specifies the specific joints and the location of the specific joints, the boundary module 146 can analyze the framework to verify that no anomalies exists within the designated joints.

For example, FIG. 4A depicts a simple architectural element that comprises a visible upper surface 400, a visible side surface 404, and a visible front surface 402. As depicted, the front surface 402 and the side surface 404 meet each other at miter joint 420, the side surface 404 and the upper surface 400 meet each other at joint 430 where upper surface 400 overlaps side surface 404, and upper surface 400 and front surface 402 meet each other at joint 410 where upper surface 400 overlaps front surface 402. In at least one implementation, the boundary module 146 can analyze the joints of FIG. 4A and determine that the above-recited joints do not create any anomalies, and can thus be left as they are.

In contrast to FIG. 4A, the initial joints of FIG. 4B do create an anomaly 440. In FIG. 4B, top surface 400 meets front surface 402 at joint 412 where front panel 402 overlaps upper surface 400. Additionally, front surface 402 meets side surface 404 at joint 422 where side surface 404 overlaps front surface 402. Further, side surface 404 meets upper surface at joint 432 where upper surface 400 overlaps side surface 404.

In at least one implementation, the boundary module 146 can analyze the joints of FIG. 4B and identify the presence of anomaly 440. Additionally, in response to identifying the presence of anomaly 440, the boundary module 146 can resolve the anomaly 440 by automatically adjusting the joints. For example, the boundary module 146 can change boundary 422 such that the front panel 402 overlaps the side panel 404. One will appreciate that this change in the joint configuration will resolve the anomaly.

In determining what boundaries to change, the boundary module 146 can operate such that the most recently specified joint is preserved and others are changed. In contrast, the boundary module 146 can change joints such that the earliest specified joints are preserved and the most recently specified joints are changed. In addition, in at least one implementation, a user can specify that a particular joint be given priority over other joints.

In at least one implementation, the boundary module 146 can allow a designer to make changes to the joints of a particular architectural element at any time without having to worry about anomalies. For example, if a designer has created a framework for a dresser, but a customer would prefer different joints, the designer can simply change the borders as requested and the boundary module 146 can automatically implement the change, verify that no anomalies exist, and if so, correct the anomaly.

Once an architectural element has been sufficiently designed within a framework 200, the manufacturing preparation module 130 can prepare the framework 200 for actual production at a millwork facility. For example, the manufacturing preparation module 130 can adjust the framework 200 to meet the specification of the millwork facility and/or the end client. In at least one implementation, this can include adjusting the framework 200 to incorporate a specific material type, or a specific material thickness, adjusting the framework 200 to fit within a particular space, incorporating the appropriate third party hardware into the design, incorporating the appropriate attachments into the framework, or adjusting some other portion of the framework 200.

Figure 5A:
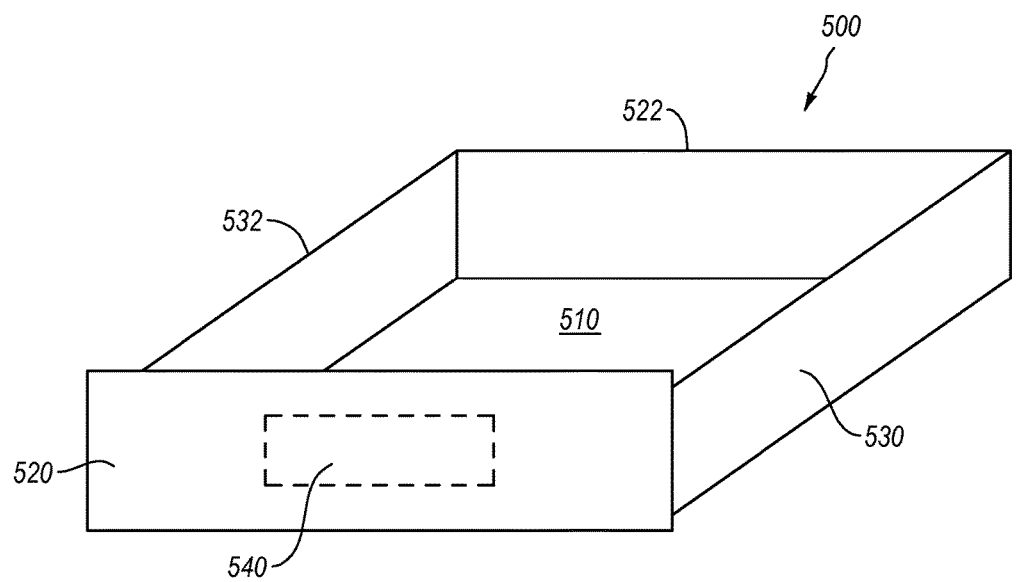
FIGS. 5A-5D depict various implementations of applying third party finishing features to an architectural element.

For example, FIG. 5A depicts a portion of a framework 200 representing a drawer 500. Specifically, the depicted drawer 500 comprises a backside 522, a left side 532, a right side 530, a front side 520, and a bottom 510. In at least one implementation, the manufacturing preparation module 130 can identify that a front side 520 comprises a third party hardware interface area 540 (i.e., a location where a handle can be attached). In response to identify the third party hardware interface area 540, the manufacturing preparation module 130 can access information relating the appropriate attachment. For example, in at least one implementation, the building preferences and specifications of a variety of millwork facilities may be stored within the storage device 150. As such, the manufacturing preparation module 130 can determine the millwork facility that will be manufacturing the architectural element and can then access the stored information from the storage device 150.

Figure 5B:
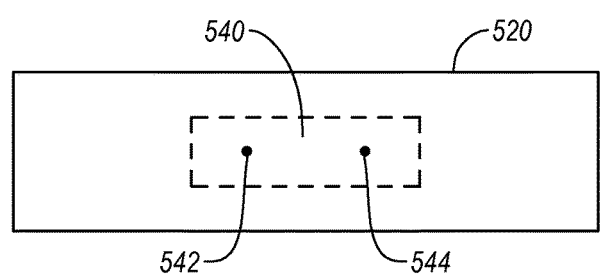

For example, the manufacturing preparation module 130 can identify that the millwork facility utilizes handles that are anchored by two screws a certain distance apart. Based upon this information the manufacturing preparation module 130 can place two holes that are the appropriate distance apart within the third party hardware interface area 540 of the front side 520 as shown in FIG. 5B.

Similarly, the manufacturing preparation module 130 can identify the type of connections that are appropriate for a particular framework 200. As mentioned above, the appropriate type of connection may be specific to the millwork facility that is manufacturing the architectural element, may be specified by an end client, or may be determined through some other means. Accordingly, prior to determining a connection type, panels are depicted as abutting with no particular connection 542, as shown in FIG. 5C.

In at least one implementation, the manufacturing preparation module 130 can identify that a connection 542 is supposed to exist between the two surfaces 510, 542. Using information stored within the storage device 150 of from user input the manufacturing preparation module 130 can determine that appropriate type of connection.

Figure 5C:
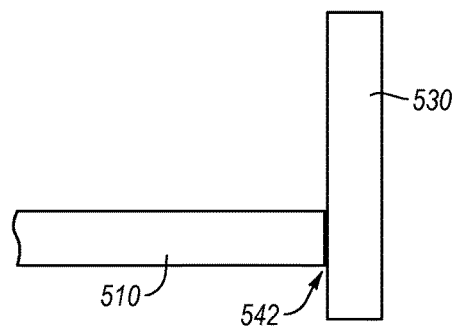
Figure 5D:
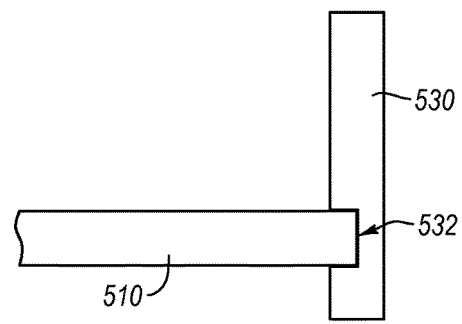

FIG. 5D depicts the drawer of FIG. 5C after the manufacturing preparation module 130 has applied a specified connection type 532 to the drawer. For example, the connection 532 can comprise the bottom side 510 being inset into the right side 530. Upon determining and applying the proper connection type, the manufacturing preparation module 130 can create a file that will direct a millwork facility to cut a groove into the side wall of right side 530 at such a depth and location that the joint functions as designed in FIG. 5D.

In at least one implementation, a millwork facility can prepare a parts list and design preference file and provide the list to the millwork software 100. Once the millwork software 100 has access to the parts list and identifies the millwork facility as being the manufacturer of a particular architectural element the manufacturing preparation module 130 can automatically incorporate the parts and design preferences of the millwork facility into the framework 100. In particular, the manufacturing preparation module 130 can transform a framework consisting of planes, spaces, lines and other abstract features into a schematic that incorporates the proper measurements, materials, material widths, and third party hardware.

Once a user has finished designing an architectural element the manufacturing preparation module 130 can generate CNC code (or equivalent) that describes the architectural element. In an alternate implementation, the manufacturing preparation module 130 can generate parameters that are exported to a post processor that generates the CNC code. Once the appropriate CNC code is generated a millwork facility can use the code to create the designed architectural element.

Figure 6:
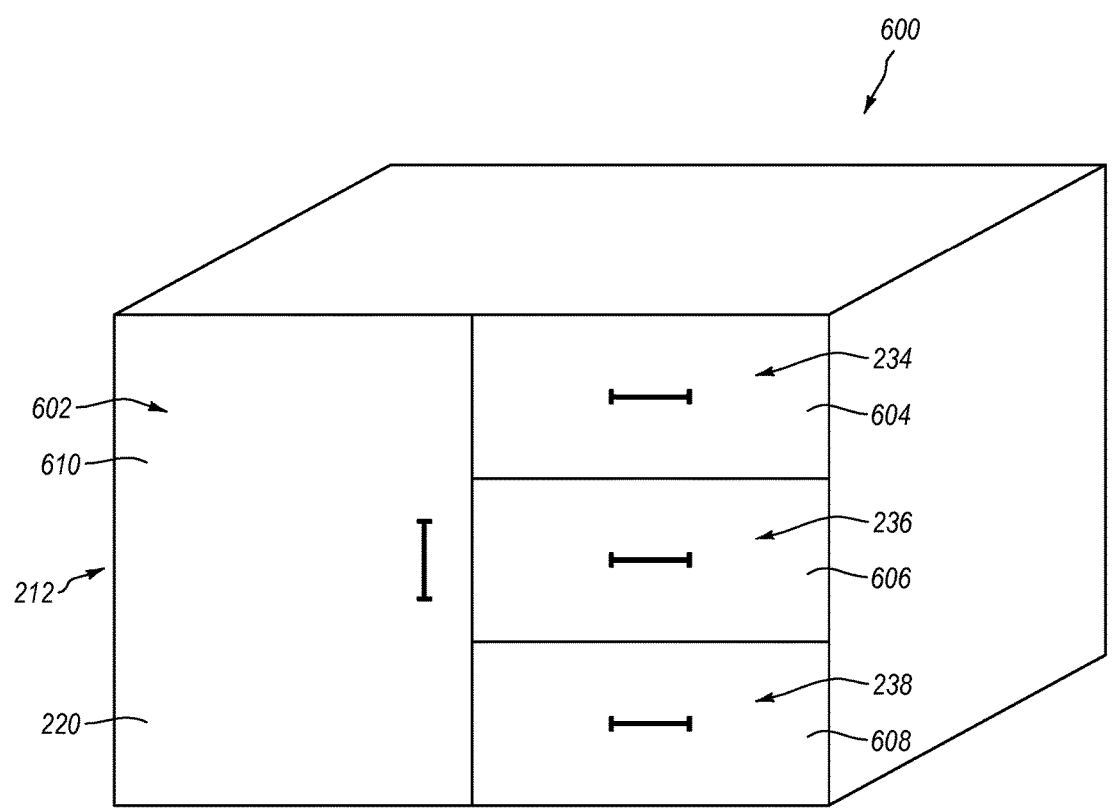
FIG. 6 depicts a finished rendering of an architectural element.

FIG. 6 depicts a finished rendering of the architectural element 200. In particular, the storage unit 600 comprises a cupboard 602 that correlates with space 212 that was create by the placement of cube splitter 210. The door 610 of the cupboard can be associated with facet 220. In addition, the desk 600 comprises three drawers 604, 606, 608 that were created by the combined placement of the cube splitter 210 and the facet splitters 230 and 232. As depicted facet 234 can be associated with drawer 604, facet 236 with drawer 606, and facet 238 with drawer 608. In at least one implementation, additional designing that was not depicted directly by this application may have also been added to the framework 200. For example, the drawer 500 of FIGS. 5A-5D may have also been designed and added to the framework 200 of FIG. 6.

Additionally, in at least one implementation, gaps can be automatically added to the various components of a framework 200 such that features like drawers 234, 236, 238 and doors 610 are easy to open and close and are not overly snug. In some cases, the gaps may comprise slight millimeter spaces that are incorporated around the edges of a particular facet 212, 234, 236, 238. One will understand that if certain components of architectural elements are not designed and built with a gap the component may not function or may function poorly.

In at least one implementation, the storage device can contain visual information relating to various third party hardware that specific millwork facilities use. As such, in at least one implementation, the user interface module 120 can render a depiction of the architectural element, in this case the storage unit 600, displaying the unit as it will appear in its final form, including the correct connection types and third party hardware.

In at least one implementation, once a user has design an architectural element, the user can store the design within the storage device 150 for later access. For example, in at least one implementation, this allows the user to incorporate the architectural element into a new design. In particular, the designed framework can be recursively linked to an independently executable software object within another framework.

Figure 7A:
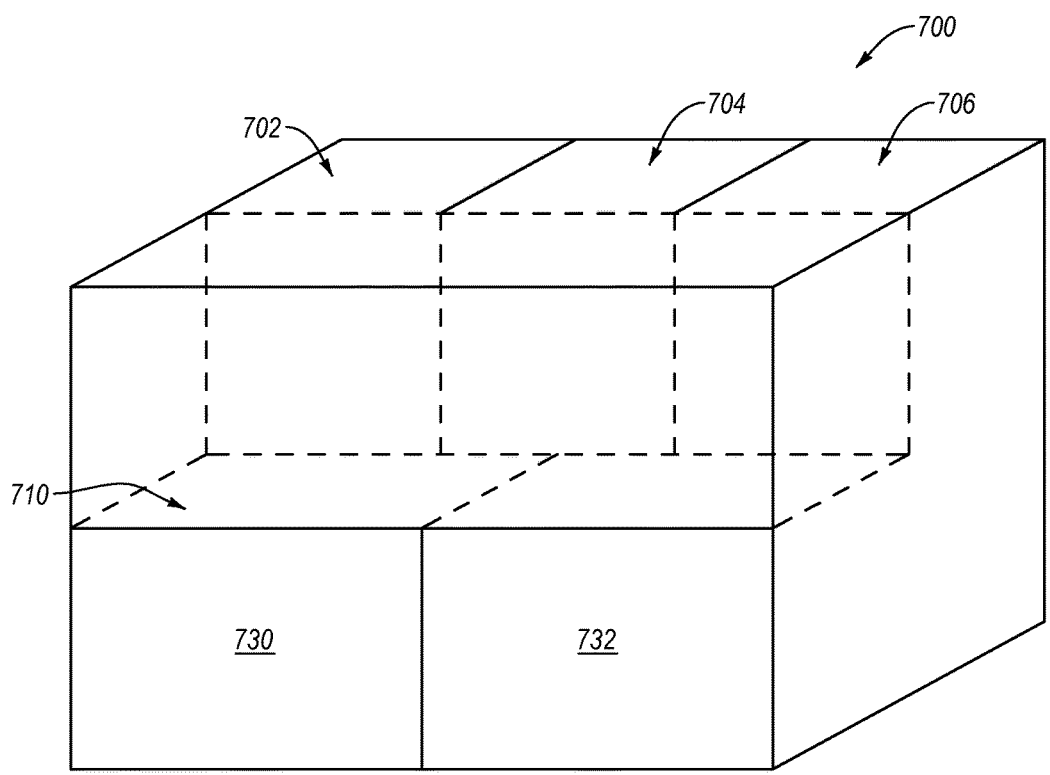
FIGS. 7A and 7B depict implementations for incorporating one framework into another.
Figure 7B:
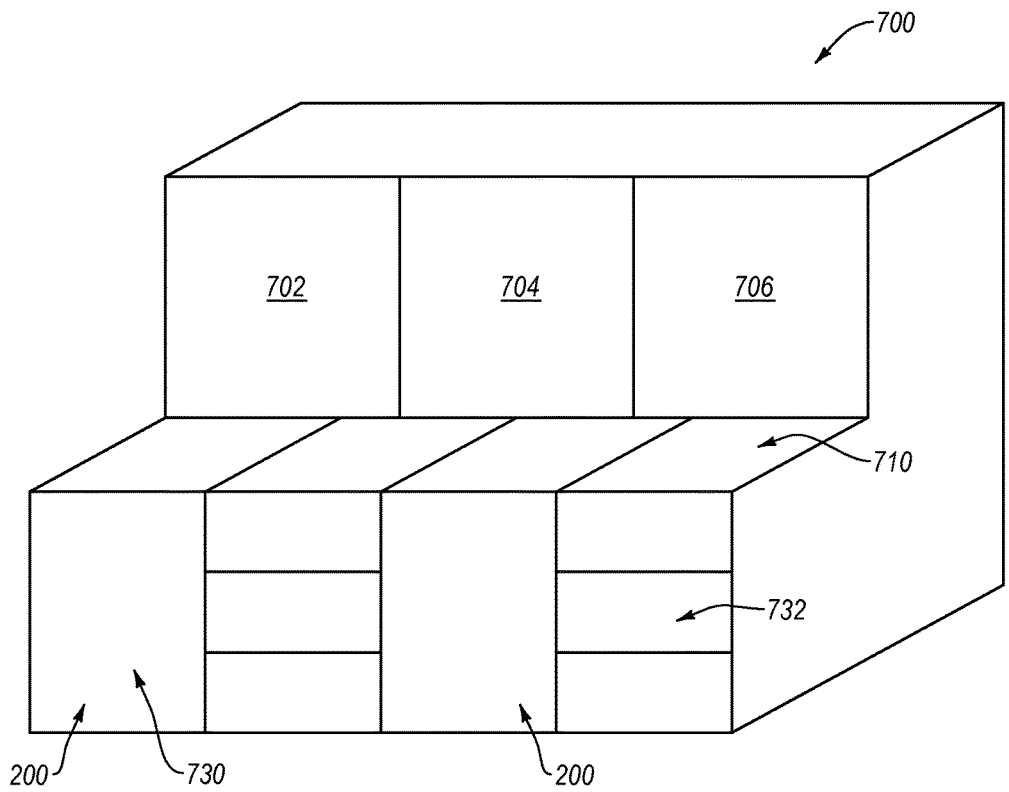

FIGS. 7A and 7B depict implementations for incorporating one framework 200 into another. For example, FIG. 7A depicts a master framework 700 that includes a counter 710, three upper spaces 702, 704, 706, and two larger lower spaces 730, 732. In at least one implementation, the framework module 140 can associate a distinct framework 200 with a space 730, 732. Specifically, the space module 144 can use the recursion module 148 to associate a distinct framework with the independently executable software object that is associated with the space 730, 732. In other words, in at least one implementation, the system associates each space 730, 732 within a framework 700 with an independently-executable software object, which can recursively reference another distinct framework 200.

By way of explanation, an independently executable software object comprises a set of computer-executable instructions used in object-oriented program code, and which relate to a particular physical component or feature. In addition, software objects can be interrelated via parent/child dependency relationships where changes in a parent object flow through to a child object and vice versa. For example, a software object created for a table may have several child objects for each leg.

In other cases, the software objects can be related to other software objects that represent physically proximate components (e.g., a wall object that is positioned next to the table object). For example the above-mentioned table software object and leg software objects can independently execute in a correlated fashion to ensure each corresponding physical component (i.e., the table top, or the table legs) is positioned appropriately, or otherwise colored and designed consistent with the user's specifications.

Returning to FIGS. 7A and 7B, a user can associate the two distinct frameworks 200 each representing the storage unit 600 from FIG. 6 with spaces 730 and 732 respectively. FIG. 7B depicts the resulting master framework 700 that includes spaces 702, 704, and 706, which can be designed into cupboards, and spaces 730 and 732, which both now contain frameworks 200 that are associated with storage units 600.

In at least one implementation, associating distinct frameworks 200 with spaces 730, 732 within a master framework provides a user with tremendous power and flexibility in creating a design. For example, each framework 200 can independently access a framework module 140 and all other associated modules 142, 144, 146, 148. This can allow a framework 200 to dynamically and automatically adjust to any changes that are made to a master framework 700.

Additionally, in at least one implementation, a storage device 150 can comprise a framework library of pre-designed architectural elements. Each of these stored frameworks can be associated with one or more independently executable software objects that can be recursively linked to other frameworks. For example, a designer can design an office space by accessing a group of stored frameworks that represent shelving units, desks, filing cabinets, cupboards, drawers, etc.

Once a designer identifies particular stored frameworks that the designer wants to use, the designer can simply insert the chosen framework into a space within a master framework. Using pre-designed frameworks a designer can create a master framework that represents an entire office. Additionally, because the entire office was designed using spatial frameworks associated with independently executable software objects, the entire office design can change automatically to account for different sizes, materials, features, etc. and such changes will correctly propagate throughout the design.

Figure 8A:
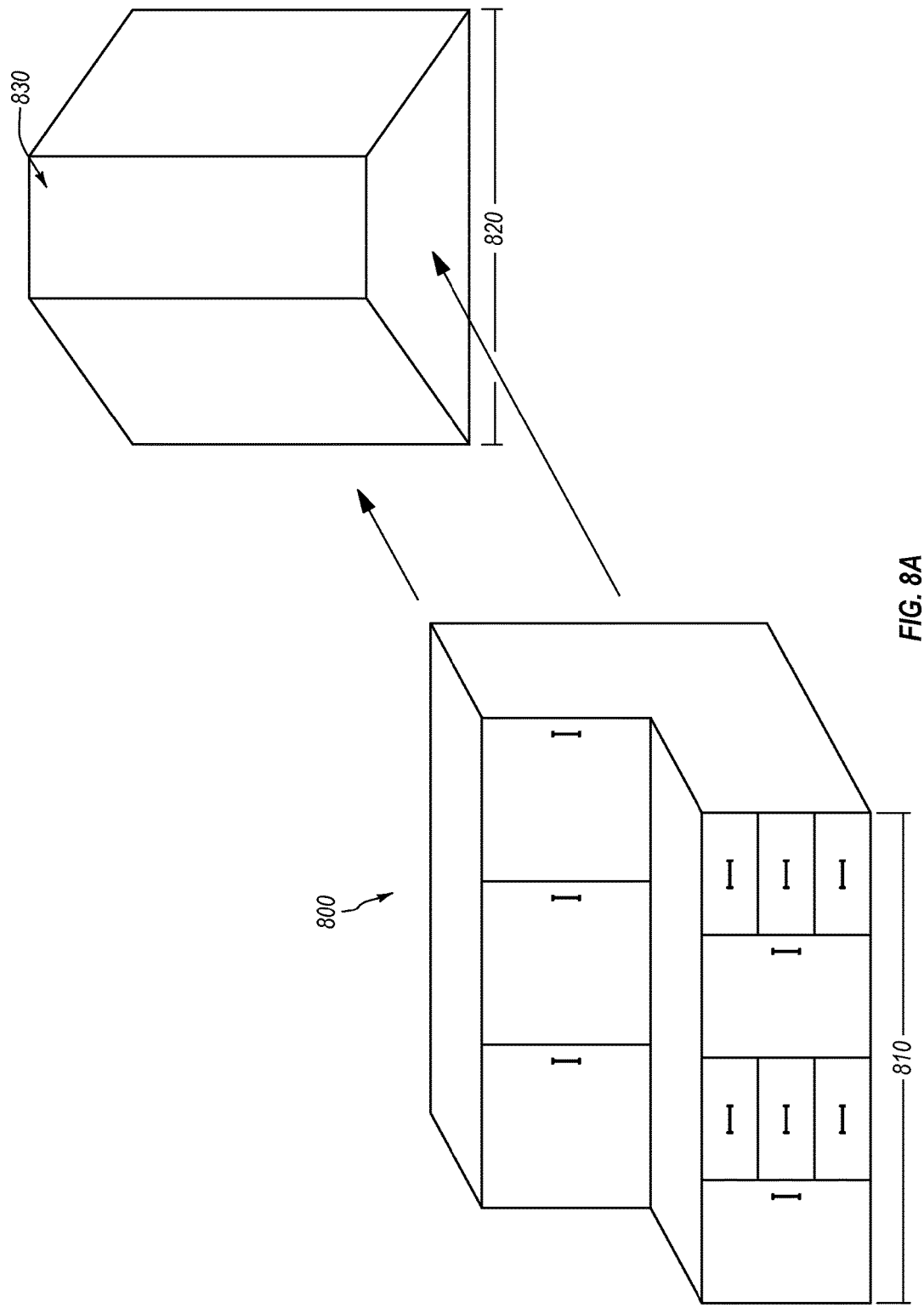

For example, FIG. 8A depicts the cabinet system 800 designed in FIGS. 7A and 7B. The cabinet system 800 comprises a length 810, and a receiving wall 830 comprises a length 820. As depicted, length 810 is significantly longer than length 820 of the receiving wall. In at least one implementation, a user can specify that the length of the cabinet system 800 should be length 820, and the framework module 140 can automatically adjust the length of the cabinet system 800 to be length 820, while at the same time automatically and correctly adjusting all of the features of the cabinet system.

FIG. 8B depicts an implementation of an adjusted cabinet system 800. In this implementation, the framework module 140 automatically removed a cupboard and one of the storage units. In at least one implementation, the removal of the cupboard and storage unit may be a result of using absolute measurements when tracking the location and behavior of the cube splitters 210 and facet splitters 230, 232 as described with respect to FIG. 3. In particular, the framework module 140 may have identified that the storage unit length was reduced so much that there was no longer room to place the cube splitters 210 and facet splitters 230, 232 as was specified. Accordingly, the framework module 140 can automatically determine that because the original length specifications cannot be met, a cupboard and a storage unit should be removed.

Figure 9B:
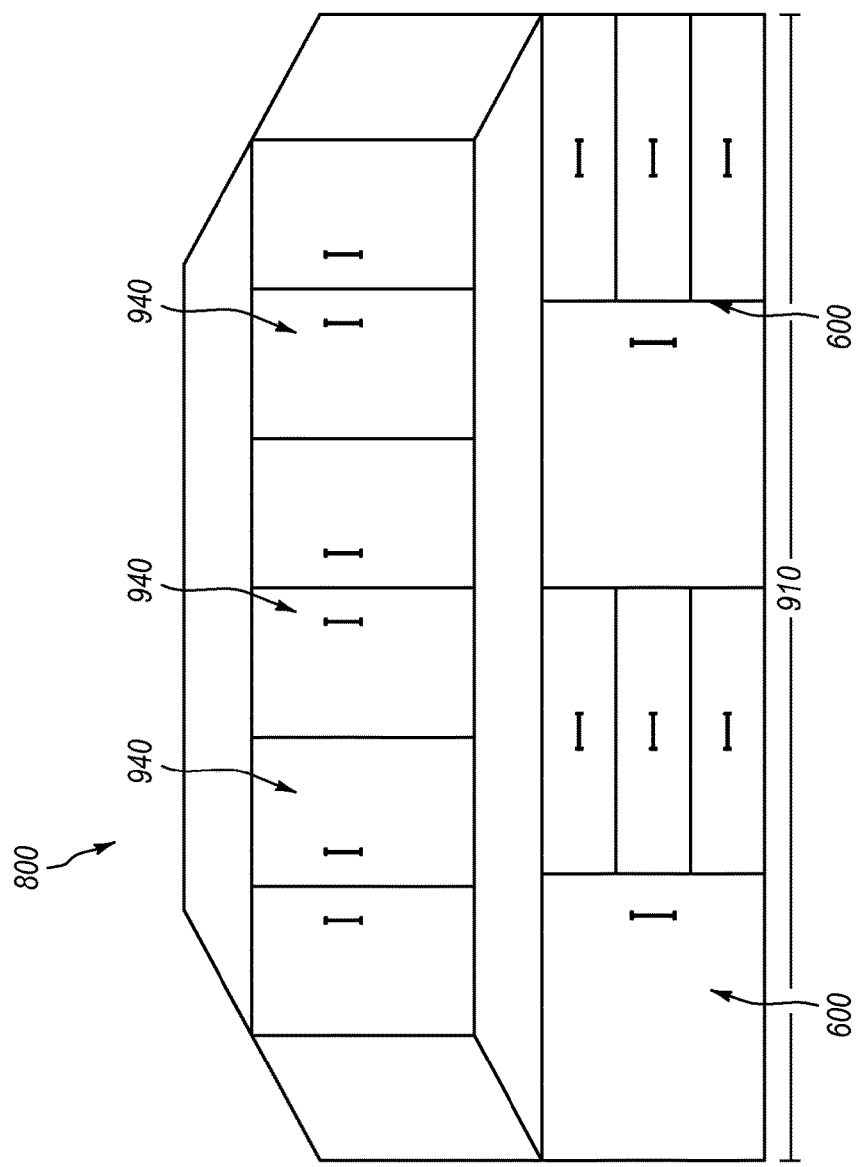

As an alternate example, FIGS. 9A and 9B depict an architectural element being expanded to fit a particular specification. For example, the cabinet system 800 comprises a length 810 and a receiving wall 930 comprises a length 910. As depicted, length 810 is significantly smaller than length 910 of the receiving wall 930. As stated above, in at least one implementation, a user can specify that the length of the cabinet system 800 should be 910, and the framework module 140 can automatically adjust the length of the cabinet system 800 to be length 910 while at the same time automatically and correctly adjusting all of the features of the cabinet system.

FIG. 9B depicts an implementation of an adjusted cabinet system 800. In this implementation, the framework module 140 automatically expanded the length of the storage units 600 and added double doors 940 to each of the three cabinets. In at least one implementation, the expansion of the storage unit may be a result of using proportional measurements when tracking the location and behavior of the cube splitters 210 and facet splitters 230, 232 as described with respect to FIG. 3. In particular, the framework module 140 may have identified that the cube splitter between spaces 730 and 732 was specified as being placed at half the length of the bottom most boundary. As such, the framework module 140 simply expanded the storage units to fill the larger length.

With respect to the cupboards, in at least one implementation, the framework module 140 and/or the manufacturing preparation module 130 can automatically identify some finishing features, such as, for example, whether a cupboard is narrow enough to only require a single door, or so wide as to require double doors 940. In the depicted example, the framework module 140 and/or the manufacturing preparation module 130 determined that double door were appropriate due to the increased length of the cabinet system 800.

Accordingly, FIGS. 1-9 and the corresponding text illustrate or otherwise describe one or more components, modules, and/or mechanisms for creating a variable spatial framework for use in designing and manufacturing an architectural component. One will appreciate that implementations of the present invention can also be described in terms of methods comprising one or more acts for accomplishing a particular result. For example, FIGS. 10 and 11 and the corresponding text illustrate flowcharts of a sequence of acts in a method for creating a variable spatial framework for use in designing and manufacturing an architectural component. The acts of FIGS. 10 and 11 are described below with reference to the components and modules illustrated in FIGS. 1-9.

Figure 10:
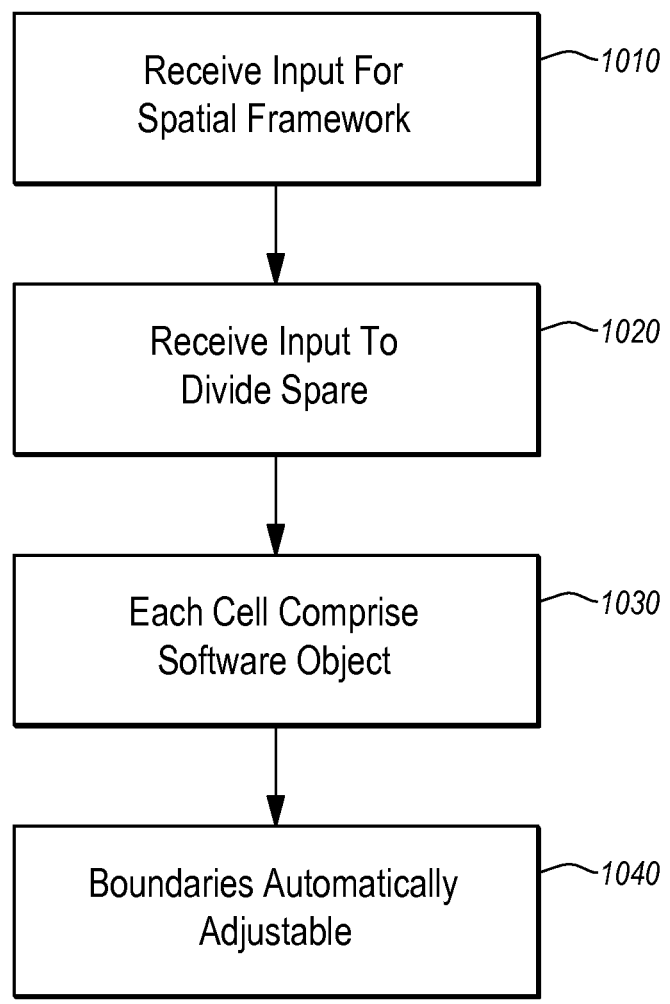
FIG. 10 illustrates a flowchart of a series of acts in a method in accordance with an implementation of the present invention for creating a variable spatial framework for use in designing and manufacturing an architectural component.
Figure 11:
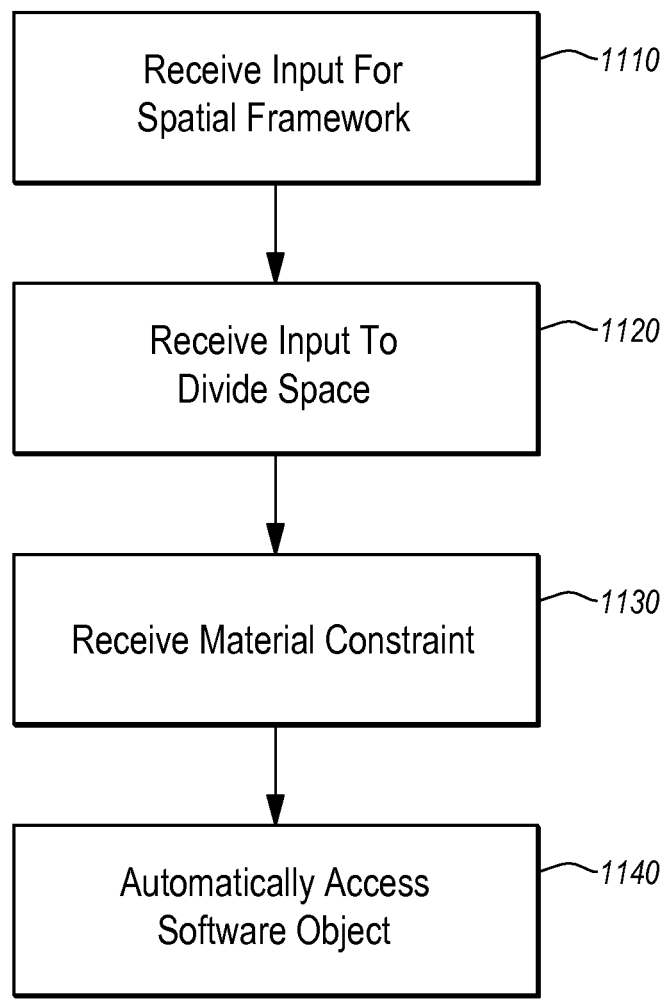
FIG. 11 illustrates another flowchart of a series of acts in a method in accordance with an implementation of the present invention for creating a variable spatial framework for use in designing and manufacturing an architectural component.

For example, FIG. 10 illustrates that a method for creating a variable spatial framework for use in designing and manufacturing an architectural component can comprise an act 1010 of receiving inputs for spatial framework. Act 1010 includes receiving input for a spatial framework for use in designing and manufacturing an architectural component. The spatial framework can define a three-dimensional space having a plurality of boundaries. For example, FIGS. 1 and 2A-2C show various implementations of a millwork software application 100 receiving inputs regarding a spatial framework that defines a three-dimensional space having a plurality of boundaries.

FIG. 10 also shows that the method can comprise an act 1020 of receiving inputs to divide a space. Act 1020 includes receiving input to divide the three-dimensional space, the three-dimensional space dividing input changing the three-dimensional space into multiple independent cells. For example, FIG. 2A-2C show that a framework can be divided into multiple cells.

Furthermore, FIG. 10 shows that the method can comprise an element 1030 wherein each cell comprises a software object. Element 1030 can include each independent cell comprising an independently executable software object. For example, FIG. 1 and FIGS. 7A and 7B, along with the accompanying description, describe the interaction and use of the independently executable software object that can be associated with spaces within the framework.

Further still, FIG. 10 shows that the method can comprise an element 1040 wherein boundaries automatically adjust. Element 1040 can include a plurality of boundaries of the spatial framework that can be automatically adjusted upon receiving an input defining a manufacturing constraint. For example, FIGS. 8A-9B show various implementations of a framework automatically adjusting to meet particular specifications.

Additionally, FIG. 11 shows that a method for creating a variable spatial framework for use in designing and manufacturing an architectural component can comprise an act 1110 of receiving inputs for spatial framework. Act 1110 includes receiving input for a spatial framework for use in designing and manufacturing an architectural component, the spatial framework defining a three-dimensional space having a plurality of boundaries. For example, FIGS. 1 and 2A-2C show various implementations of a millwork software application 100 receiving inputs regarding a spatial framework that defines a three-dimensional space having a plurality of boundaries.

FIG. 11 also shows that the method can comprise an act 1120 of receiving inputs to divide a space. Act 1120 includes receiving input to divide the three-dimensional space, the three-dimensional space dividing input changing the three-dimensional space into multiple independent cells, wherein each independent cell comprises an independently executable software object. For example, FIG. 2A-2C show that a framework can be divided into multiple cells, and FIG. 1 and FIGS. 7A and 7B, along with the accompanying description, describe the interaction and use of the independently executable software object that can be associated with spaces within the framework.

Furthermore, FIG. 11 shows that the method can comprise an act 1130 of receiving a manufacturing constraint. Act 1130 includes receiving at least one manufacturing constraint that defines at least one physical characteristic of an object that will be manufactured based upon the spatial framework. For example, FIGS. 8A-9B show various implementations of a framework automatically adjusting to meet manufacturing constraints relating to the final length of the object that will be manufactured.

Further still, FIG. 11 shows that the method can comprise an act 1140 of automatically accessing a software object. Act 1140 includes automatically accessing at least one independently executable software object to adjust at least a portion of the spatial framework to incorporate the received manufacturing constraint. For example, FIG. 1 and FIGS. 7A and 7B, along with the accompanying description, describe the interaction and use of the independently executable software object that can be associated with spaces within the framework.

Accordingly, FIGS. 1-11 provide a number of components, schematics, and mechanisms for creating a variable spatial framework for use in designing and manufacturing an architectural component. Additionally, one or more implementations can allow a user to develop an architectural element, such as a desk or even an entire kitchen, without knowing the final constraints of the design. For example, a user can design a kitchen, including cabinets, drawers, counter tops, sink locations, etc., without knowing the final size of the kitchen, the materials that will be used to construct the cabinet and counter, or the final third party elements, such as the actual sink type, knob and handle configurations, wood joints, etc. One will appreciate that implementations of the present invention provide tremendous flexibility and power to designers and millwork facilities by allowing designers to construct detailed and specific schematics that can automatically be adjusted to the meet the needs of a user and the manufacturing process of a millwork facility.

The embodiments of the present invention may comprise a special purpose or general-purpose computer including various computer hardware components, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The present invention may be embodied in other specific forms without departing from its spirit or essential characteristics. For example, the flexible dies can include flexible protrusions on both the front and back surfaces. Thus, a single flexible die can form recesses into surfaces of two different panels at the same time. Furthermore, the panels can include recesses in both the front and back surfaces. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:

1. In a computerized environment, a computerized method of creating a variable spatial framework for use in designing and manufacturing an architectural component, the method comprising:
   receiving input for a variable spatial framework for use in designing and manufacturing one or more architectural components, the variable spatial framework both comprising an independent cell corresponding to at least one architectural component and defining a three-dimensional space having a plurality of boundaries; and
   receiving input to divide the independent cell corresponding to at least one architectural component, the independent cell dividing input changing the independent cell into multiple independent cells, each independent cell corresponding to at least one architectural component;
   wherein:
      each independent cell comprises an independently executable software object, the independently executable software objects allowing each cell of the architectural component to be independently updated and changed irrespective of changes made to other cells, each given newly created independent cell inheriting one or more characteristics from an independent cell from which the given newly created independent cell was created; and
   the plurality of boundaries of the spatial framework are automatically adjustable upon receiving an input defining a manufacturing constraint.

2. The method as recited in claim 1, further comprising:
   accessing a data file containing manufacturer specific information;
   wherein the manufacturer specific information comprises information relating to the manufacturing configuration of a specific manufacturer; and
   automatically adjusting the variable spatial framework to account for the manufacturing configuration of the specific manufacturer.

3. The method as recited in claim 1, further comprising:
   accessing a data file containing manufacturer specific information;
   wherein the manufacturer specific information comprises information relating to the manufacturing configuration of a specific manufacturer; and
   automatically adjusting a computer numerical control code to account for the manufacturing configuration of the specific manufacturer.

4. The method as recited in claim 1, wherein the independently executable software object comprises another spatial framework.

5. The method as recited in claim 4, further comprising:
   displaying to a designer a library of frameworks representing pre-designed architectural components;
   receiving an indication from the user selecting a particular framework representing a particular pre-designed architectural component; and
   associating the particular framework representing the particular pre-designed architectural component with a cell within the variable spatial framework.

6. The method as recited in claim 1, further comprising:
   receiving at least one manufacturing constraint;

wherein the at least one manufacturing constraint defines at least one physical characteristic of an object that will be manufactured based upon the spatial framework.

7. The method as recited in claim 6, wherein the manufacturing constraint comprises a material type that will be used to construct the object.

8. The method as recited in claim 6, wherein the manufacturing constraint comprises a size measurement of the object that will be manufactured.

9. The method as recited in claim 6, wherein the manufacturing constraint comprises a thickness of a material that will be used to construct the object.

10. The method as recited in claim 1, further comprising:
identifying one or more distinct surfaces associated with one or more distinct portions of the spatial framework, wherein the one or more distinct surfaces are representative of physical surfaces in the architectural component;
determining that a first surface of the one or more distinct surfaces and a second surface of the one or more distinct surfaces communicate with each other through a joining means;
identifying that the joining means comprises a particular connection interface;
determining that the particular connection interface creates an anomaly within at least one joining means associated with any of the one or more distinct surfaces; and
automatically adjusting one or more connection interfaces associated with one or more joining means to eliminate the anomaly.

11. The method as recited in claim 10, further comprising:
automatically creating a gap surrounding at least one surface;
wherein the gap provides sufficient space between the at least one surface and any adjacent surfaces that the at least one surface can freely be removed from the architectural component.

12. The method as recited in claim 1, further comprising:
identifying a surface associated with a portion of the spatial framework, wherein the surface is representative of a physical surface in the architectural component; and
receiving input to divide the surface, the surface dividing input changing the surface into multiple independent surfaces.

13. The method as recited in claim 12, wherein the surface comprises a thickness that is also divided by the dividing input.

14. The method as recited in claim 12, wherein:
the surface dividing input comprises a surface dividing line extending from a first boundary to a second boundary; and
a location of the surface dividing line within the spatial framework is determined with respect of a location of an intersection of the surface dividing line with the first boundary and an intersection of the surface dividing line with the second boundary.

15. The method as recited in claim 14, wherein the location of the intersection of the surface dividing line and the first boundary is a specific distance from a first end of the first boundary.

16. The method as recited in claim 14, wherein the location of the intersection of the surface dividing line and the first boundary is a measured proportional distance from a first end of the first boundary.

17. A computer-based system comprising one or more processors configured to execute computer-executable instructions for a method of creating a variable spatial framework for use in designing and manufacturing an architectural component, the method comprising:
receiving input for a spatial framework for use in designing and manufacturing one or more architectural components, the spatial framework both comprising an independent cell corresponding to at least one architectural component and defining a three-dimensional space having a plurality of boundaries;
receiving input to divide the independent cell corresponding to at least one architectural component, the independent cell dividing input changing the independent cell into multiple independent cells, each independent cell corresponding to at least one architectural component, wherein each independent cell is associated with a distinct independently executable software object, the independently executable software objects allowing each cell of the architectural component to be independently updated and changed irrespective of changes made to other cells, each given newly created independent cell inheriting one or more characteristics from an independent cell from which the given newly created independent cell was created;
receiving at least one manufacturing constraint that defines at least one physical characteristic of an object that will be manufactured based upon the spatial framework; and
automatically adjusting at least a portion of the spatial framework to incorporate the received manufacturing constraint.

18. The system as recited in claim 17, further comprising:
identifying a connection interface within the spatial framework, wherein the connection interface corresponds with a region within the architectural component that will require a joining means;
determining that the joining means comprises a particular type of connection;
determining that the particular type of connection creates an anomaly within at least one joining means within the architectural component; and
automatically adjusting one or more connection interfaces associated with one or more joining means to allow for the particular connection interface and to eliminate the anomaly.

19. The system as recited in claim 17, further comprising: identifying a surface associated with a portion of the spatial framework, wherein the surface is representative of a physical surface in the architectural component; receiving input to divide the surface, the surface dividing input comprising a surface dividing line extending from a first boundary to a second boundary; and determining a location of the surface dividing line within the spatial framework with respect to a location of an intersection of the surface dividing line with the first boundary and an intersection of the surface dividing line with the second boundary.

20. A computer program product for use at a computer system, the computer program product for creating a variable spatial framework for use in designing and manufacturing an architectural component, the computer program product comprising one or more computer storage media having stored thereon computer-executable instructions that, when executed at a processor, cause the computer system to perform a method comprising:
receiving input for a variable spatial framework for use in designing and manufacturing one or more architectural components, the variable spatial framework both comprising an independent cell corresponding to at least one architectural component and defining a three-dimensional space having a plurality of boundaries; and receiving input to divide the independent cell corresponding to at least one architectural component, the independent cell dividing input changing the independent cell into multiple independent cells, each independent cell corresponding to at least one architectural component;

wherein:

each independent cell comprises an independently executable software object, the independently executable software objects allowing each cell of the architectural component to be independently updated and changed irrespective of changes made to other cells, each given newly created independent cell inheriting one or more characteristics from an independent cell from which the given newly created independent cell was created; and a plurality of boundaries of the spatial framework are automatically adjustable upon receiving an input defining a manufacturing constraint.

* * * * *